(12) United States Patent
Blech et al.

(10) Patent No.: US 6,745,232 B1
(45) Date of Patent: Jun. 1, 2004

(54) STROBED SYNCHRONIZATION PROVIDING DIAGNOSTICS IN A DISTRIBUTED SYSTEM

(75) Inventors: Steven P. Blech, Twinsburg, OH (US); Gregory A. Majcher, Broadview Heights, OH (US); John P. Caspers, Racine, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 730 days.

(21) Appl. No.: 09/644,635

(22) Filed: Aug. 23, 2000

(51) Int. Cl.$^7$ ............................................. G06F 15/14
(52) U.S. Cl. .................... 709/208; 709/102; 709/107; 709/209; 700/13; 700/14; 700/229; 700/230
(58) Field of Search .................. 709/102, 107; 700/2, 9, 11–14, 19–21, 26, 229, 230

(56) References Cited

U.S. PATENT DOCUMENTS

| | | | |
|---|---|---|---|
| 4,361,876 A | 11/1982 | Groves | 710/32 |
| 4,609,922 A | 9/1986 | Boegli et al. | |
| 4,691,317 A | 9/1987 | Miazga et al. | 714/3 |
| 4,829,445 A | 5/1989 | Burney | |
| 5,201,397 A | 4/1993 | Isaccs | 198/395 |
| 5,247,668 A | 9/1993 | Smith et al. | 717/154 |
| 5,285,887 A | 2/1994 | Hall | 198/460.1 |
| 5,382,971 A | 1/1995 | Chanteau | 725/144 |
| 5,453,674 A | 9/1995 | Seki et al. | 318/573 |
| 5,519,726 A | 5/1996 | DiCarlo | 375/224 |
| 5,525,959 A * | 6/1996 | Przybyla et al. | 340/438 |
| 5,582,286 A | 12/1996 | Dummermuth | 172/395 |
| 5,608,618 A | 3/1997 | Kosaka et al. | 700/61 |
| 5,793,982 A | 8/1998 | Sharder et al. | 709/232 |
| 5,809,220 A | 9/1998 | Morrison et al. | 714/12 |
| 5,844,795 A * | 12/1998 | Johnston et al. | 700/83 |
| 5,862,391 A | 1/1999 | Salas et al. | 713/300 |
| 5,862,907 A | 1/1999 | Taylor | 198/781.05 |
| 5,872,904 A | 2/1999 | McMillen et al. | 714/4 |
| 5,872,911 A | 2/1999 | Berg | 714/43 |
| 5,887,029 A | 3/1999 | Husted et al. | 375/224 |
| 5,896,292 A * | 4/1999 | Hosaka et al. | 700/108 |
| 5,906,268 A | 5/1999 | Kalm | 198/781.06 |
| 5,980,082 A | 11/1999 | Watanabe et al. | 700/86 |
| 6,009,454 A * | 12/1999 | Dummermuth | 709/108 |
| 6,021,888 A | 2/2000 | Itoh et al. | 198/783 |
| RE36,632 E | 3/2000 | Iwande | 358/498 |
| 6,035,999 A | 3/2000 | Hall | 198/781.06 |
| 6,044,305 A * | 3/2000 | Larson et al. | 700/87 |
| 6,081,518 A | 6/2000 | Bowman-Amuah | 370/352 |
| 6,088,628 A | 7/2000 | Watanabe et al. | 700/264 |
| 6,163,129 A | 12/2000 | Younger et al. | 318/799 |
| 6,193,054 B1 | 2/2001 | Henson et al. | 198/783 |
| 6,244,421 B1 | 6/2001 | Hall | 198/460.1 |
| 6,253,906 B1 | 7/2001 | Hall | 198/460.1 |
| 6,253,909 B1 | 7/2001 | Kalm et al. | 198/781.06 |
| 6,324,443 B1 | 11/2001 | Kurakake et al. | 700/245 |

FOREIGN PATENT DOCUMENTS

EP 0953524 A2 3/1999

* cited by examiner

*Primary Examiner*—Frantz B. Jean
(74) *Attorney, Agent, or Firm*—Amin & Turocy LLP; Alexander M. Gerasimow; R. Scott Speroff

(57) ABSTRACT

A method and system are provided for executing a control function or program which minimizes or overcomes the shortcomings of conventional systems. The invention allows a user of a distributed control system to place one or more control devices into a step mode, wherein the devices will execute a specified number of iterations of their internal logic or control programs, or execute such programs for a specified time period, and then stop or suspend execution. The user may then perform system diagnostics, for example, by interrogating certain modules to obtain output and input values, etc. The system may then be further iterated and the method repeated, so as to enable the identification of logic programming and/or hardware problems in a system.

15 Claims, 11 Drawing Sheets

STROBED SYNCHRONIZATION PROVIDING DIAGNOSTICS IN A DISTRIBUTED SYSTEM

TECHNICAL FIELD

The present invention relates to the art of industrial controllers, and more particularly to a method and apparatus for strobed synchronization in a distributed control system.

BACKGROUND OF THE INVENTION

Industrial controllers are special purpose computers used for controlling industrial processes, manufacturing equipment, and other factory automation applications. In accordance with a control program, an industrial controller may measure one or more process variables or inputs reflecting the status of a controlled process, and change outputs effecting control of the process. The inputs and outputs may be binary, (e.g., on or off), as well as analog inputs and outputs assuming a continuous range of values. The control program may be executed in a series of execution cycles with batch processing capabilities.

The measured inputs received from a controlled process and the outputs transmitted to the process generally pass through one or more input/output (I/O) modules. These I/O modules serve as an electrical interface between the controller and the controlled process, and may be located proximate or remote from the controller. The inputs and outputs are recorded in an I/O table in processor memory. Input values may be asynchronously read from the controlled process by one or more input modules and output values are written directly to the I/O table by the processor for subsequent communication to the process by specialized communications circuitry. An output module may interface directly with a controlled process, by providing an output from an I/O table to an actuator such as a motor, valve, solenoid, and the like.

During execution of the control program, values of the inputs and outputs exchanged with the controlled process pass through the I/O table. The values of inputs in the I/O table are asynchronously updated from the controlled process by dedicated scanning circuitry. This scanning circuitry may communicate with input and/or output modules over a bus on a backplane or network communications. The scanning circuitry also asynchronously writes values of the outputs in the I/O table to the controlled process. The output values from the I/O table are then communicated to one or more output modules for interfacing with the process. Thus, the processor may simply access the I/O table rather than needing to communicate directly with the controlled process.

An industrial controller may be customized to a particular process by writing control software that may be stored in the controller's memory and/or by changing the hardware configuration of the controller to match the control task. In distributed control systems, controller hardware configuration is facilitated by separating the industrial controller into a number of control modules, each of which performs a different function. Particular control modules needed for the control task may then be connected together on a common backplane within a rack and/or through a network or other communications medium. The control modules may include processors, power supplies, network communication modules, and I/O modules exchanging input and output signals directly with the controlled process. Data may be exchanged between modules using a backplane communications bus, which may be serial or parallel, or via a network. In addition to performing I/O operations based solely on network communications, smart modules exist which may execute autonomous logical or other programs.

Various control modules of a distributed industrial control system may be spatially distributed along a common communication link in several racks. Certain I/O modules may thus be located in close proximity to a portion of the control equipment, and away from the remainder of the controller. Data is communicated with these remote modules over a common communication link, or network, wherein all modules on the network communicate using a standard communications protocol.

In a typical distributed control system, one or more I/O modules are provided for interfacing with a process. The outputs derive their control or output values in the form of a message from a master or peer device over a network or a backplane. For example, an output module may receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process. Input modules measure a value of a process variable and report the input values to a master or peer device over a network or backplane. The input values may be used by a processor (e.g., a PLC) for performing control computations.

Conventional control devices typically provide a run mode wherein a module executes a control program and a configure mode wherein the control program execution is suspended. As control systems become more widely distributed, the logic or control program associated with a particular process or system may be executed on a large number of modules or devices. In this way, individual processors in the devices execute a program autonomously from the rest of the system components. Smart devices, such as I/O modules, transducers, sensors, valves, and the like may thus be programmed to execute certain logical or other programs or operations independently from other such devices.

The distribution of smart devices in a networked control system has many advantages. However, system testing and troubleshooting are often more difficult in distributed systems. In a system with many autonomous smart devices, each having its own control logic or program, problems in system performance cannot easily be traced to a specific device. Once the component devices in such a system are placed into execute or run mode, the logic or control programs associated therewith run independently, and are often not synchronized. Even where certain control devices in a system are synchronized to certain events, determining the source of a system control problem is still difficult.

In many cases, the source of a control problem is an error in programming a particular module. For example, the logic function in a particular module may be the function of several input values or states. Problems in the logic function may only be discernable in one or a small number of input combinations. In widely distributed control system architectures, system events occur asynchronously, such as I/O value state changes, messages, etc. Thus, when a problem occurs, it may be difficult to determine the source of the error.

This is particularly problematic in system startup situations. Large control systems are typically tested before application to a real process, with inputs simulated and outputs tested under a variety of input conditions. In addition, control system diagnostics are needed in the field, when problems in system performance are recognized, or when system parameters are changed. Present diagnostic tools are typically limited to simulating input signals and monitoring output values. Conventional control devices do not provide for ease of troubleshooting in such distributed control system applications.

SUMMARY OF THE INVENTION

In accordance with the present invention, a method and system are provided for executing a control function or program which minimizes or overcomes the shortcomings of conventional systems. The invention allows a user of a distributed control system to place one or more control devices into a step mode, wherein the devices will execute a specified number of iterations of their internal logic or control programs, or execute such programs for a specified time period, and then stop or suspend execution. The user may then perform system diagnostics, for example, by interrogating certain modules to obtain status information, output and input values, and the like. The system may then be further iterated and the method repeated, so as to enable the identification of logic programming and/or hardware problems in a system. The system and methodology of the present invention thereby provide for significantly improved diagnostic and troubleshooting capabilities over conventional systems.

In accordance with one aspect of the invention, there is provided a method of performing a function in a control device comprising storing a program in the control device, receiving a message from the communications medium, wherein the message includes a parameter, executing at least a portion of the stored program in the control device according to the parameter, and suspending or stopping execution of the stored program according to the parameter. The message may put the device into a step mode, or may cause execution of at least a portion of the program in a device which is already in a step mode by virtue of, for example, a previous mode change message. The method allows a user to begin execution of a control device program or internal logic for a limited or specified time period or number of logic iterations, after which the device will suspend execution.

According to another aspect of the invention, the device may provide data to the communications medium in response to a data request message from the network while execution of the stored program is suspended. This allows a user to diagnose or analyze the system state in order to facilitate troubleshooting of system problems. In addition, the invention further allows the user to repeat the execution of a portion of the program and to again suspend execution via, for example, another message from the communications medium. In this way, a process and associated control system can be iterated or single stepped in a controlled manner, with the capability of data analysis between execution iterations.

In accordance with another aspect of the invention, a network message may include a step type and a parameter, wherein the step type is a timed step and the parameter is a step time value. In response the device may execute the stored program for a fixed time period according to the step time value, and stop program execution after the fixed time period. Thus, a user may, for example, start a device for 3 seconds, after which the condition of the system I/O can be verified.

Still another aspect of the invention provides a message wherein the step type is step iteration, and the parameter is an integer number of iterations. Upon receipt of this type of message, the device may execute the stored program an integer number of times according to the parameter, and then stop program execution after the integer number of iterations. In this manner, a user may cause one or more devices in a distributed control system to perform N iterations of their internal logic programs, where N is an integer, after which the state of the controlled process may be interrogated.

The invention further contemplates that many such distributed control system devices can be interconnected (e.g., via a network or other communications medium), and that one, some, and/or all such devices may respond to such a step command message in the above manner. Thus the invention includes the capability to iterate an entire distributed control system with one such message.

In accordance with yet another aspect of the invention, there is provided a system for performing a control function comprising a control device adapted to execute a stored program and to receive messages from a communications medium, and a master device adapted to send a message to the control device via the communications medium, the message comprising a parameter, wherein the control device is further adapted to execute at least a portion of the stored program according to the parameter and to subsequently suspend execution of the stored program according to the parameter. The system allows a user to perform diagnostics and troubleshooting heretofore unavailable with conventional distributed control system products. The message may comprise, for example, a step type, and the control device may be adapted to execute at least a portion of the stored program and suspend execution of the stored program according to the step type.

According to another aspect of the system, the step type may be, for example, a timed step and the parameter may be a step time value. In this regard, the control device may be adapted to execute the stored program for a fixed time period according to the step time value, and to stop execution of the stored program after the fixed time period. This allows a user to perform time sliced operation of one, some, or all of the control devices in a distributed control system, with the capability of data analysis between fixed time execution periods.

According to still another aspect of the invention, the step type may be step iteration, and the parameter may be an integer number of iterations. The control device, for example, may be adapted to execute the stored program an integer number of times according to the parameter, and to stop execution of the stored program after the integer number of iterations. This aspect of the invention allows a user to perform single step operation of one, some, or all of the control devices in a distributed control system, with the capability of data analysis between iterations.

In accordance with yet another aspect of the invention, there is provided a method of performing a function in a control device comprising providing a control device adapted to selectively execute a program and to receive messages from a network, receiving a mode change message from the network, suspending execution of the program according to the mode change message, receiving a step command message from the network, executing at least a portion of the program in the control device according to the message, and suspending execution of the program according to the message.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
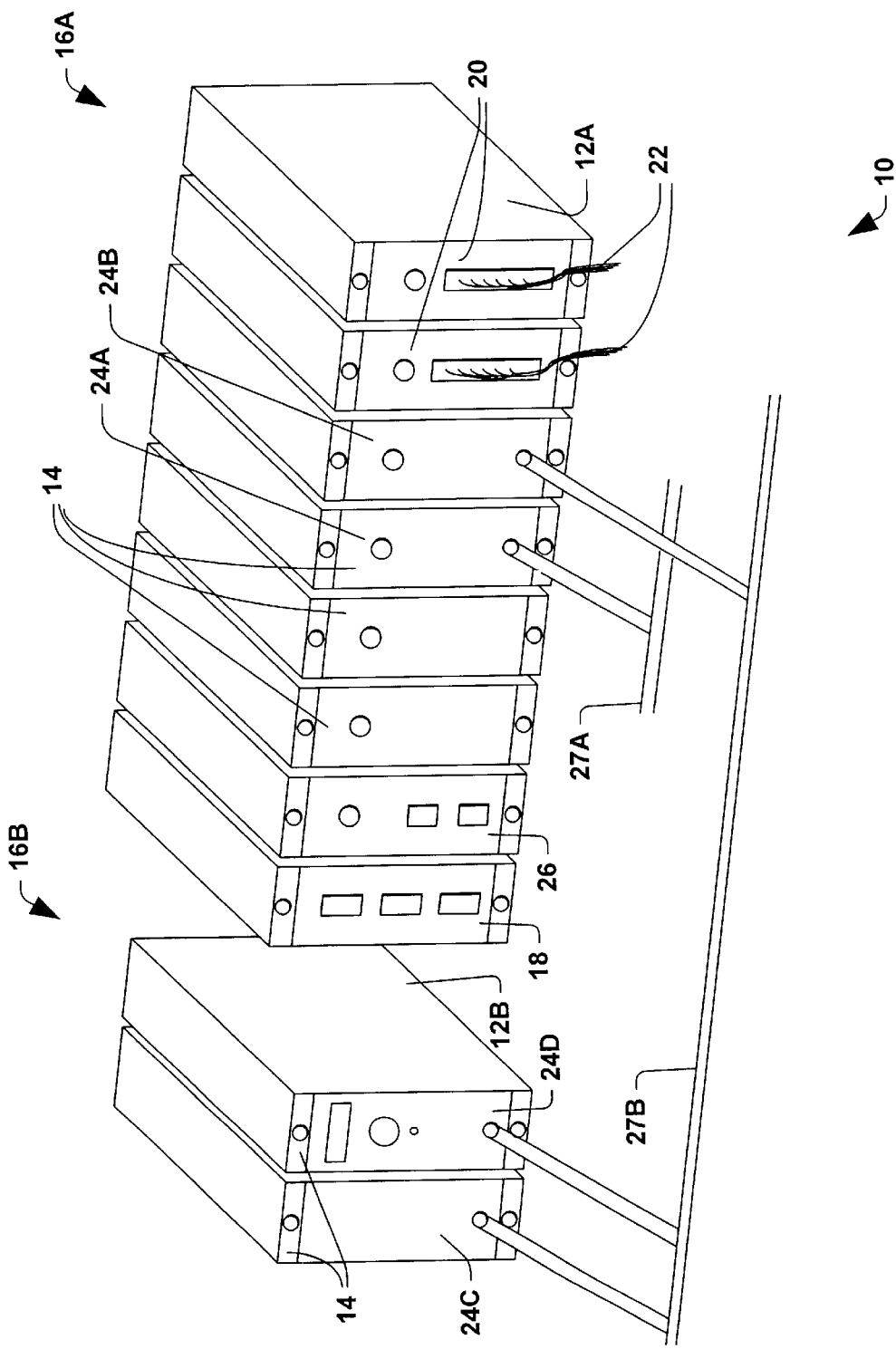
FIG. 1 is a perspective view illustrating an industrial controller having multiple functional modules contained in several racks joined by communication links.

The various aspects of the present invention will now be described with reference to the drawings, wherein like reference numerals are used to refer to like elements throughout. The invention provides a system and methodology by which a user can perform single step and/or time sliced operation of one or more control devices in a distributed control system. The user may then perform system diagnostics, for example, by interrogating certain modules to obtain status information, output and input values, and the like. The system may then be further iterated and the method repeated, thus allowing the identification of logic programming and/or hardware problems in a system. The system and methodology of the present invention thereby provides for significantly improved diagnostic and troubleshooting capabilities over conventional systems.

Referring to FIG. 1, a distributed industrial control system 10 suitable for use with the present invention provides a first and second rack 12A and 12B for holding a number of functional modules 14 electrically interconnected by backplanes 16A and 16B running along the rear of the racks 12A and 12B respectively. Each module 14 may be individually removed from the rack 12A or 12B thereby disconnecting it from its respective backplane 16 as will be described below for repair or replacement and to allow custom configuration of the distributed system 10.

The modules 14 within the rack 12A may include, for example, a power supply module 18, a processor module 26, two communication modules 24A and 24B and two I/O modules 20. A power supply module 18 receives an external source of power (not shown) and provides regulated voltages to the other modules 14 by means of conductors on the backplane 16A.

The I/O modules 20 provide an interface between inputs from, and outputs to external equipment (not shown) via cabling 22 attached to the I/O modules 20 at terminals on their front panels. The I/O modules 20 convert input signals on the cables 22 into digital words for transmission on the backplane 16A. The I/O modules 20 also convert other digital words from the backplane 16A to the necessary signal levels for control of equipment.

The communication modules 24A and 24B provide a similar interface between the backplane 16A and one of two external high speed communication networks 27A and 27B. The high speed communication networks 27A and 27B may connect with other modules 14 or with remote racks of I/O modules 20 or the like. In the example illustrated in FIG. 1, the high speed communication network 27A connects with backplane 16A via the communication module 24A, whereas the high speed communication network 27B connects the communication module 24B with communication modules 24C and 24D in rack 12B.

The processor module 26 processes information provided by the communication modules 24 and the I/O modules 20 according to a stored program and provides output information to the communication module 24 and the I/O modules 20 in response to that stored program and received input messages.

Figure 2:
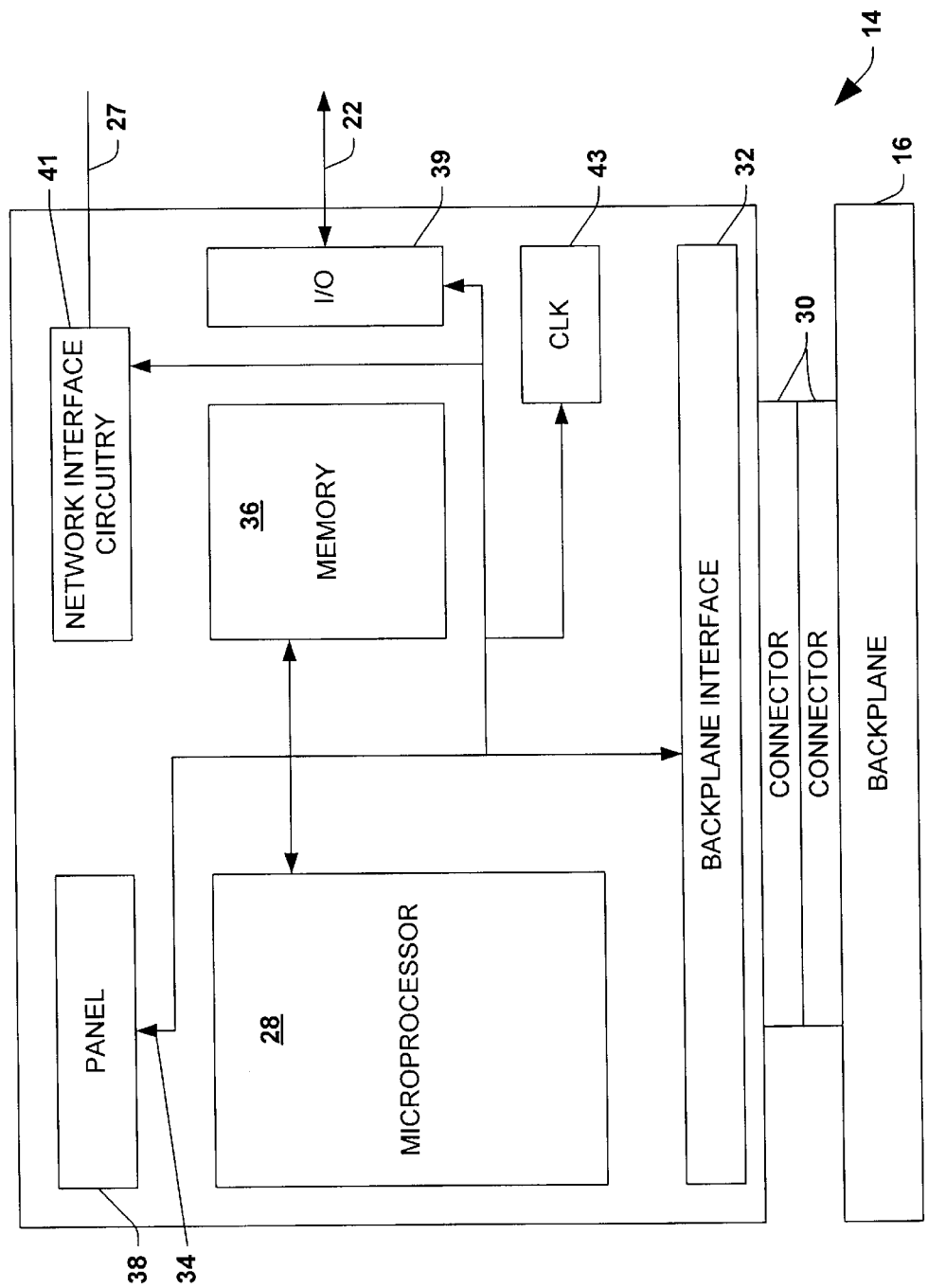
FIG. 2 is a schematic block diagram of a single functional module of FIG. 1 illustrating its connection to a common backplane and communication links to communicate with other modules.

Referring also to FIG. 2, each functional module 14, is attached to the backplane 16 by means of a separable electrical connector 30 that permits the removal of the module 14 from the backplane 16 so that it may be replaced or repaired without disturbing the other modules 14. The backplane 16 provides the module 14 with both power and a communication channel to the other modules 14.

Local communication with the other modules 14 through the backplane 16 is accomplished by means of a backplane interface 32 which electrically connects the backplane 16 through connector 30. The backplane interface 32 monitors messages on the backplane 16 to identify those messages intended for the particular module 14, based on a message address being part of the message and indicating the message's destination. Messages received by the backplane interface 32 are conveyed to an internal bus 34 in the module 14.

The internal bus 34 joins the backplane interface 32 with a memory 36, a microprocessor 28, front panel circuitry 38, I/O interface circuitry 39 (if the module is an I/O module 20) and communication network interface circuitry 41 (if the module is a communication module 24). The microprocessor 28 may be a general purpose microprocessor providing for the sequential execution of instructions contained in memory 36 and the reading and writing of data to and from the memory 36 and the other devices associated with the internal bus 34.

The microprocessor 28 includes an internal clock circuit (not shown) providing the timing of the microprocessor 28 but may also communicate with an external precision clock 43 of improved precision. This clock 43 may be a crystal controlled oscillator or other time standard including a radio link to an NBS time standard. The precision of the clock 43 is recorded in the memory 36 as a quality factor. The panel circuitry 38 includes status indication lights such as are well known in the art and manually operable switches such as for locking the module 14 in the off state.

The memory 36 holds programs executed by the microprocessor 28 to provide the functions as will be described and also variables and data necessary for the execution of those programs. For I/O modules 20, the memory 36 also includes an I/O table holding the current state of inputs and outputs received from and transmitted to the industrial controller 10 via the I/O modules 20.

Figure 3:
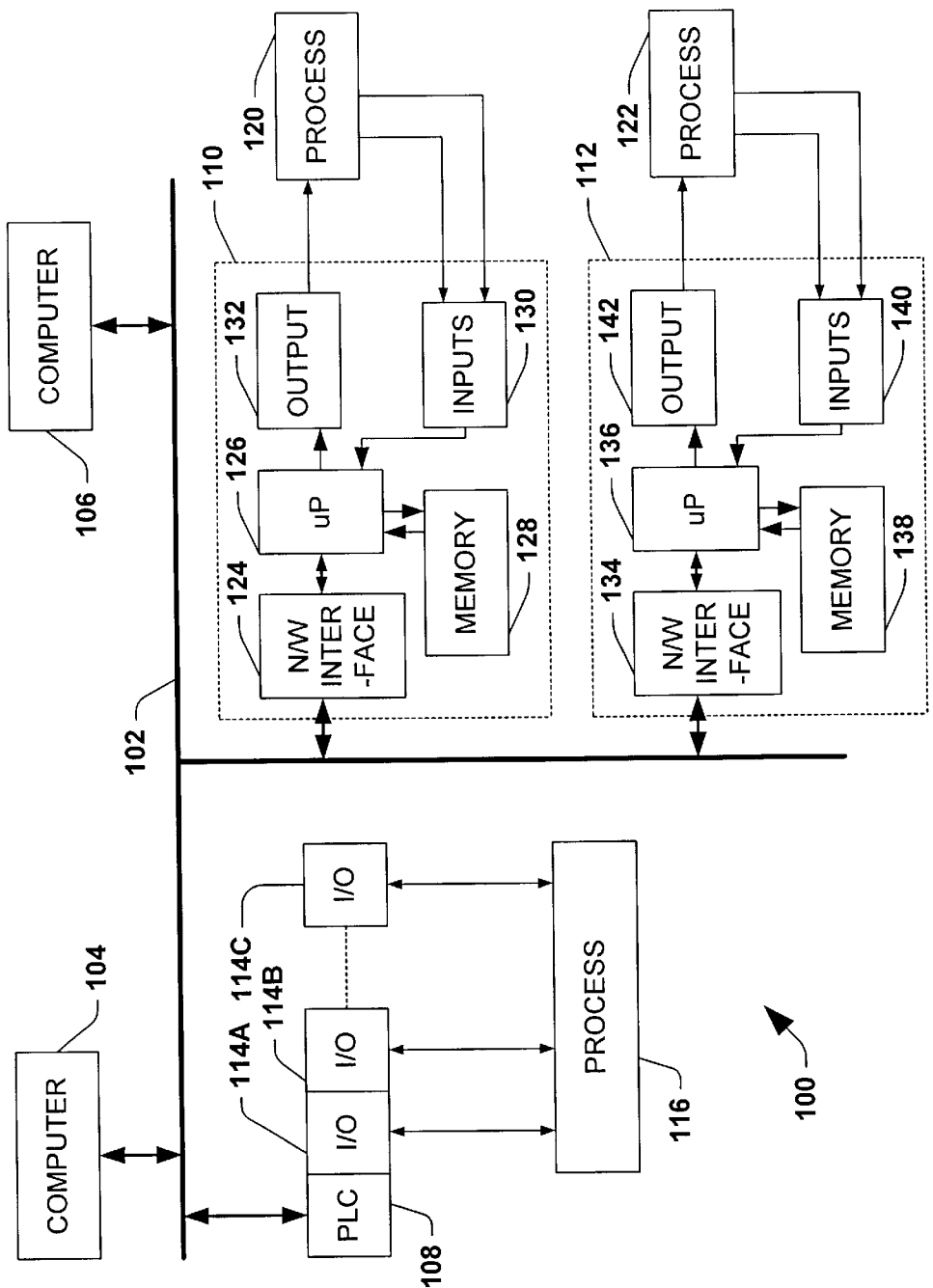
FIG. 3 is a schematic block diagram illustrating an exemplary distributed control system in which various aspects of the present invention may be implemented.

Referring now to FIG. 3, an exemplary distributed control system 100 is illustrated in which various aspects of the present invention may be implemented. The system 100 includes a network 102 interconnecting computers 104, 106, PLC 108, and control devices 110 and 112 for communication therebetween. The PLC 108 may be installed in a rack (not shown) along with one or more I/O modules 114A, 114B, and 114C, by which the PLC may communicate with the modules (hereinafter collectively referred to as 114) via a bus or other communications medium (not shown). In this manner, the PLC 108 may control a process 116 via the I/O modules 114, which may or may not directly communicate with the network 102.

The control devices 110 and 112 may be controllers and/or smart I/O modules, respectively, for controlling and/or interfacing with processes 120 and 122, respectively. Device 110 comprises a network interface 124 providing communications between a microprocessor 126 and the network 102. Microprocessor 126 is further connected to a memory 128, an input stage 130, and an output 132. The memory 128 may store a control program (not shown) and data related to the process 120, for example, an I/O table (not shown). The input stage 130 and the output 132 provide interfaces between the device 110 and the process 120. Similarly, device 112 comprises a network interface 134 providing communications between a microprocessor 136 and the network 102. Microprocessor 136 is further connected to a memory 138, an input stage 140, and an output 142. The input stage 140 and the output 142 provide interfaces between the device 112 and the process 122.

In accordance with the present invention, the devices 110 and/or 112 may receive a message (not shown) from the network communications medium 102, wherein the message includes a parameter, execute at least a portion of the stored control program (not shown) according to the message parameter, and subsequently suspend or stop execution of the stored program according to the parameter. The message may put the devices 110 and/or 112 into a step mode, or may cause execution of at least a portion of the program in the devices 110 and/or 112, which is already in a step mode by virtue of, for example, a previous mode change message. The invention thus allows a user to begin execution of a control device program or internal logic for a limited or specified time period or number of logic iterations, after which the devices 110 and/or 112 will suspend execution.

Figure 4:
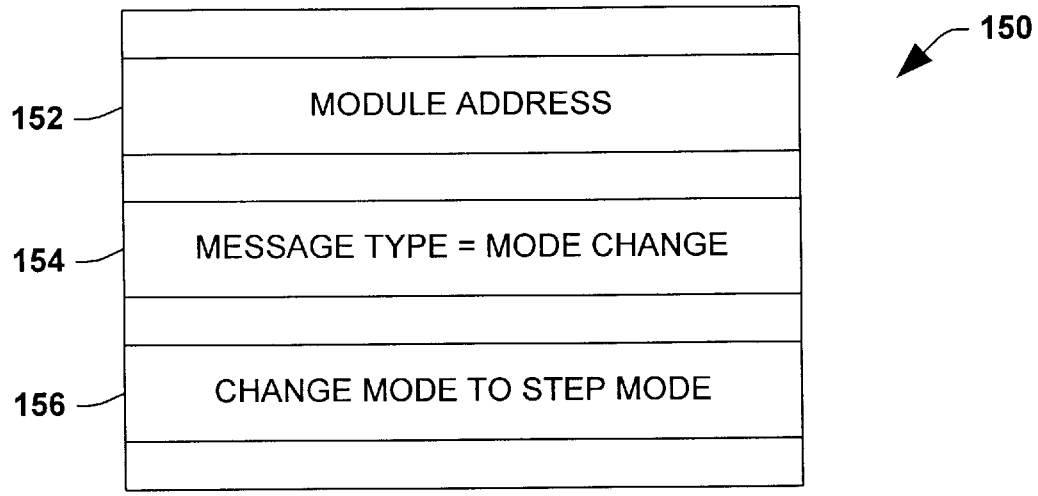
FIG. 4 is a block diagram illustrating an exemplary mode change message in accordance with the invention.

Referring also to FIG. 4, an exemplary mode change message 150 in accordance with the invention is illustrated having a module address field 152, a message type field 154, and an instruction field 156 instructing the recipient control device (e.g., devices 110 and/or 112) to change mode to step mode. Following receipt of a mode change message 150, the devices 110 and/or 112 may suspend execution of their respective stored control programs (not shown) and await another mode change message or a step command message as described in greater detail infra. As is understood in the art, the microprocessors 126 and 136 of devices 110 and 112, respectively, receive messages from the network 102 via the network interfaces 124 and 134, respectively.

Figure 5:
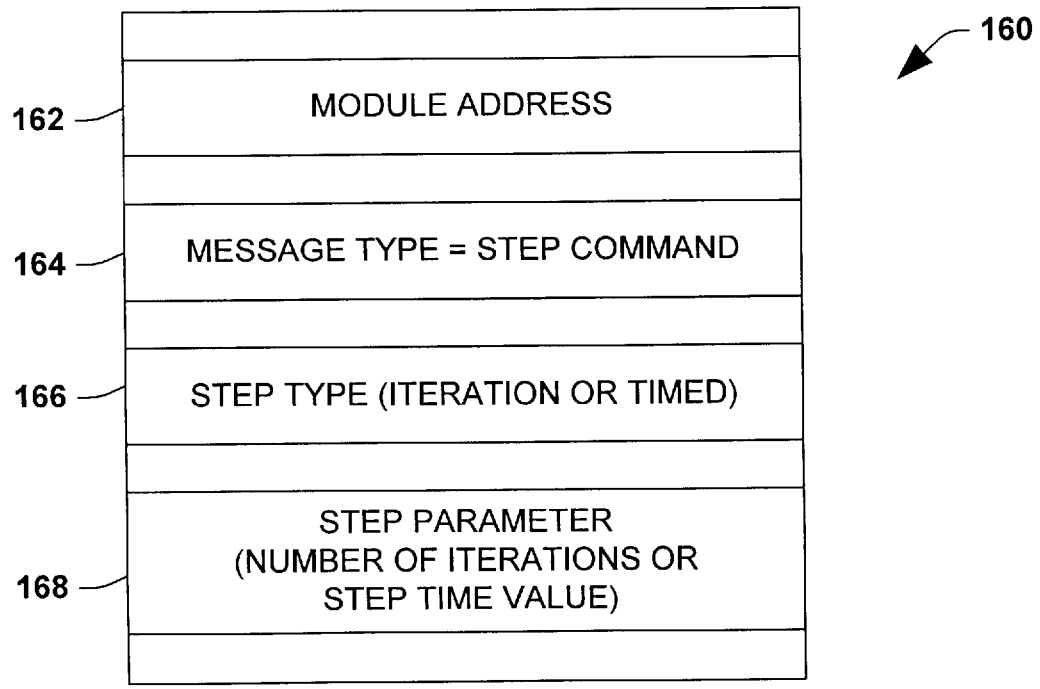
FIG. 5 is a block diagram illustrating an exemplary step command message in accordance with the invention.

FIG. 5 illustrates an exemplary step command message 160 in accordance with the invention, which comprises a module address 162, a message type field 164 indicating the type as a step command, a step type 166, and a step parameter 168. The step type 166 may comprise, for example, an indication of whether the desired step is a timed step or an iteration step. The corresponding step parameter 168 may comprise, for example, a number of iterations or a step time value, depending on the step type 166. As described in greater detail hereinafter, one or more control devices (e.g., devices 110 and/or 112) may execute a portion of their respective stored control programs (not shown) according to the step type 166 and the step parameter 168 upon receipt of the message 160 via the network 102 or other communications medium.

Figure 6:
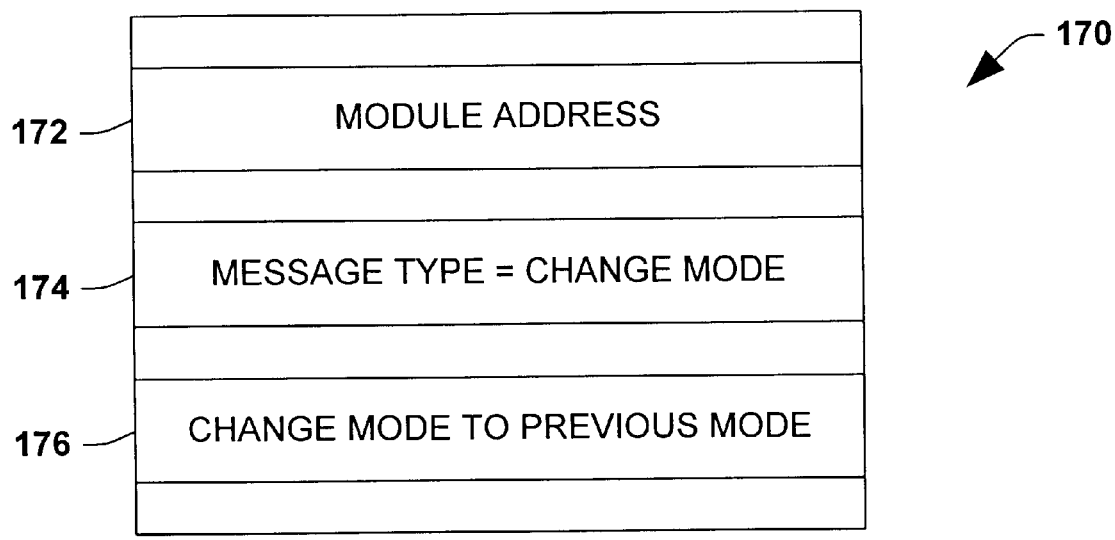
FIG. 6 is a block diagram illustrating another exemplary mode change message in accordance with the invention.

Referring now to FIG. 6, another exemplary mode change message 170 is illustrated having a module address field 172, a message type field 174, and an instruction field 176 instructing the recipient control device (e.g., devices 110 and/or 112) to change mode to the previous mode. Following receipt of such a mode change message 170, the devices 110 and/or 112 may return to execute mode and resume execution of their respective stored programs (not shown) after being in the step mode.

Figure 7A:
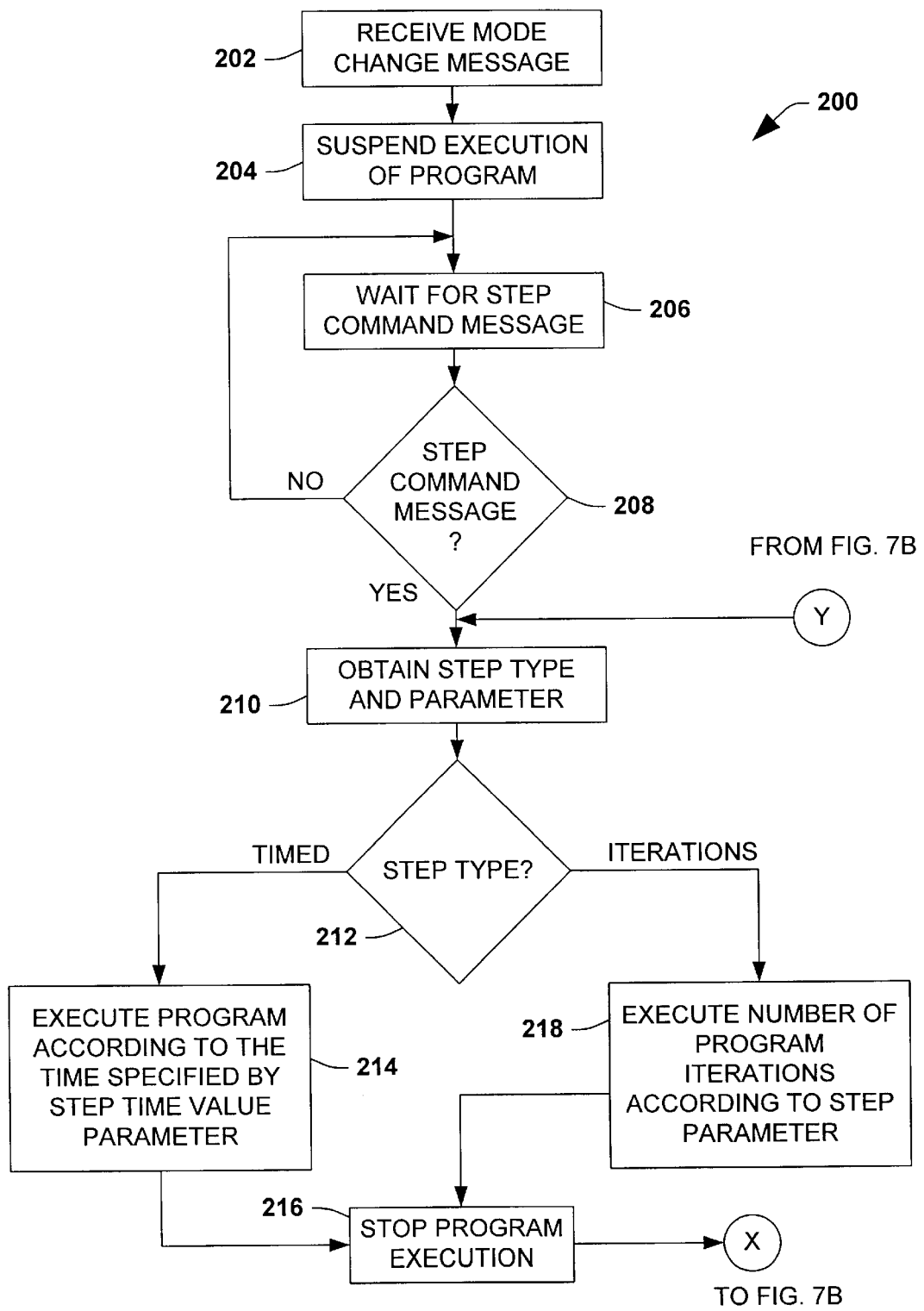
FIG. 7A is a flow diagram illustrating a method of performing a function in a control device in accordance with the invention.
Figure 7B:
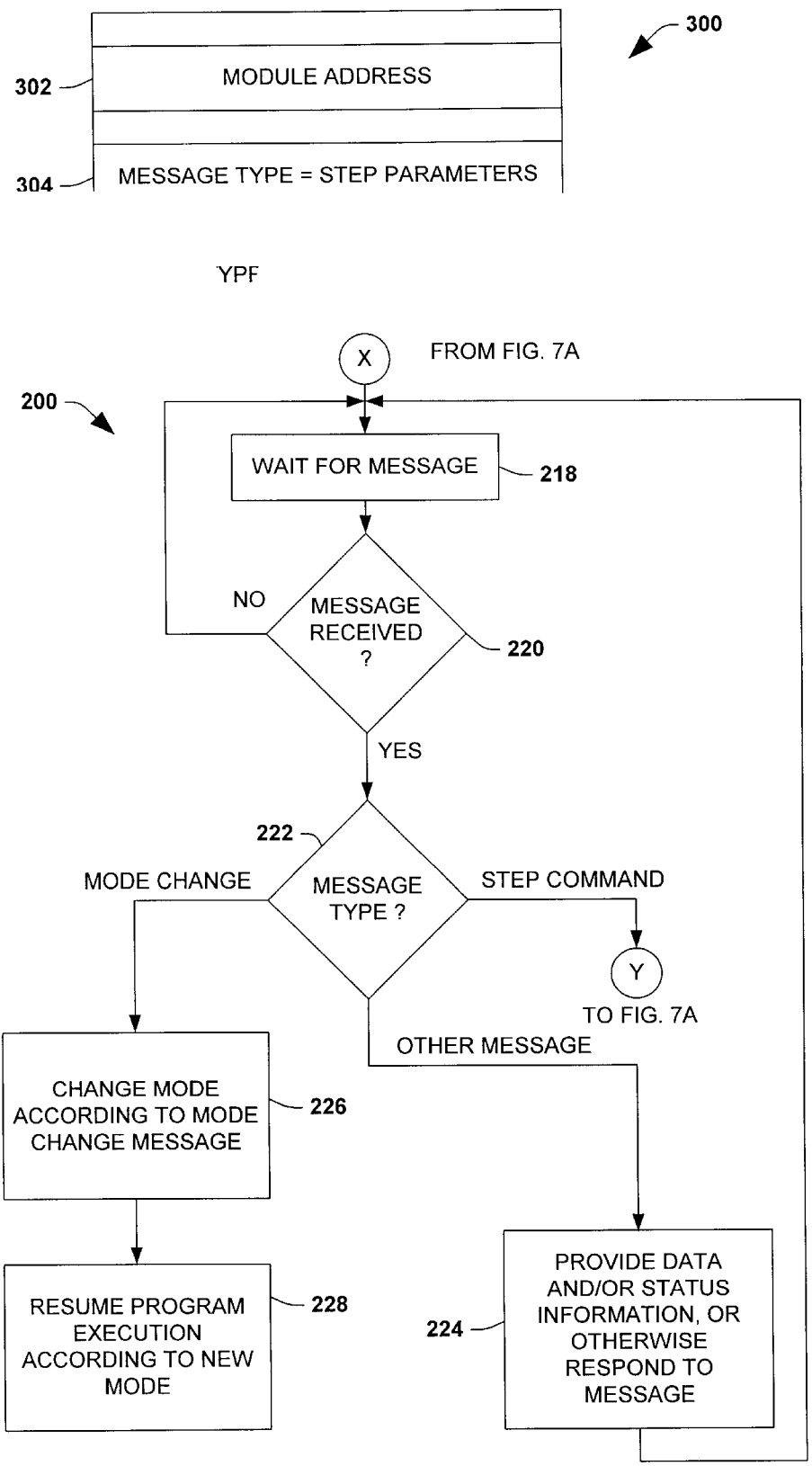
FIG. 7B is a flow diagram illustrating further aspects of the method of FIG. 7A.

FIGS. 7A and 7B illustrate an exemplary method 200 of performing a function in a control device in accordance with the present invention. The method 200 begins at step 202 where a mode change message (e.g., message 150 of FIG. 4) is received, after which program execution is suspended or stopped at step 204. Thereafter, the device waits for a step command message at steps 206 and 208. As will be appreciated from the discussion of FIGS. 10A through 10C infra, a single message may comprise both a mode change command and a step command in accordance with the invention. It will be further appreciated that messages other than step command type messages may be received at this point (e.g., I/O messages, other mode change messages, etc.), which may be operated on and/or responded to accordingly. However, for the sake of brevity, the method 200 is illustrated in FIG. 7A as waiting for a step command message via steps 206 and 208.

Once a step command has been received, the step type and parameter are obtained therefrom at step 210. Decision step 212 then determines whether the step type is timed or iterations. If the step type is timed step, the device (e.g., device 110 and/or 112) executes its stored control program according to the time specified by the step time value parameter at step 214 before program execution is suspended or stopped at step 216. Alternatively, if the step type is iterations at step 212, the device executes the number of program iterations according to the step parameter at step 218 before program execution is stopped or suspended at step 216.

Referring also to FIG. 7B, once program execution has been stopped or suspended at step 216, the control device waits for receipt of another message at steps 218 and 220. Once a message has been received from the communications medium (e.g., network 102), the message type is determined at decision step 222. If the message is a step command, the device obtains the step type and parameter from the message at step 210 of FIG. 7A as discussed supra.

If the new message is not a step command or mode change type message (e.g., I/O or other explicit message), the device provides data and/or status information, or otherwise responds to the message at step 224, before returning to step 218 to await another message. In this regard, data may be provided by a device such as device 110 of FIG. 3, via a message (not shown) on the network 102 to a device (e.g., computer 104) which requested the data. In this manner, a user may generate step messages from a computer 104, and when the device 110 has completed step mode execution and stopped, data values and/or status information may be obtained from the device 110 via I/O or other explicit messaging. Returning to FIG. 7B, if the new message is a mode change message, the device will change mode according to the new mode change message at step 226 and resume program execution according to the new mode at step 228.

Figure 8:
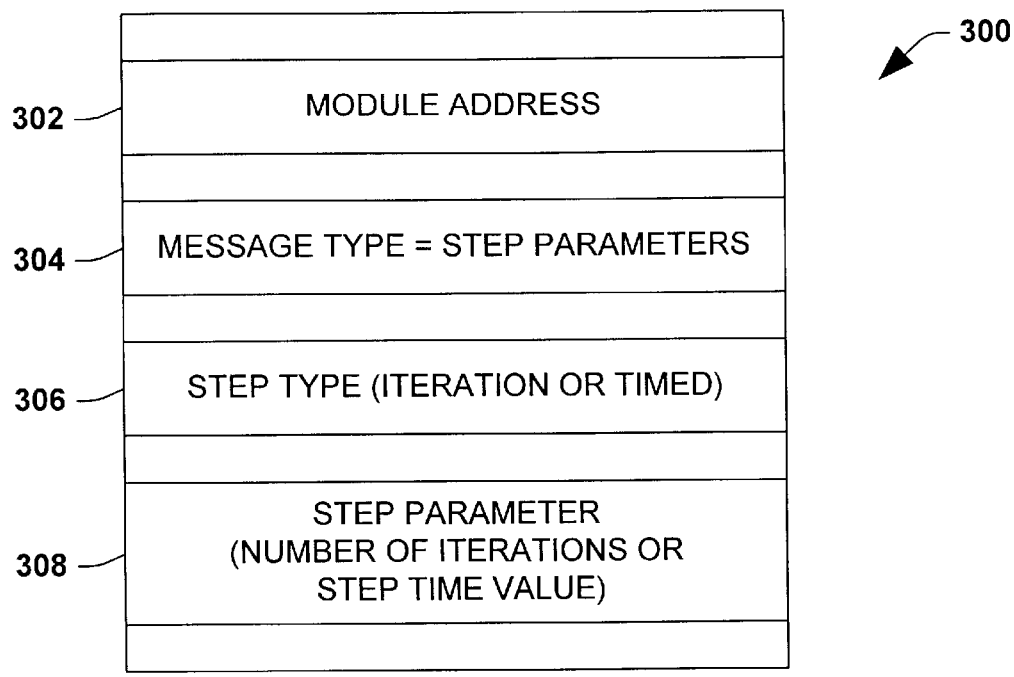
FIG. 8 is a block diagram illustrating an exemplary step parameter message in accordance with the invention.

In accordance with another aspect of the invention, step parameters may be provided to a distributed control device in a separate message. Referring now to FIG. 8, an exemplary step parameter message 300 is illustrated, having a module address 302, a message type 304 indicating a step parameter message, a step type 306 indicating iteration or timed step as described supra, and a step parameter 308 corresponding with the step type 306 and indicating a number of iterations or a step time value, respectively. This form of message provides step parameters to a device (e.g., device 110 and/or 112), for example, where a prior mode change message (e.g., message 150 of FIG. 4) has placed a control device (e.g., device 110 and/or 112 of FIG. 3) into step mode.

Figure 9:
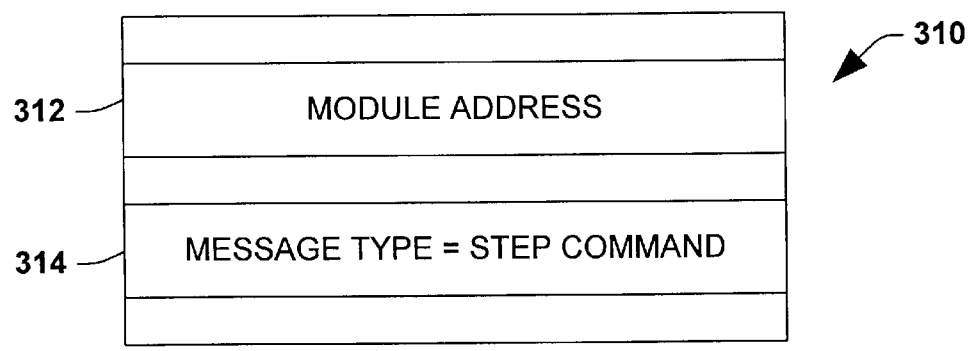
FIG. 9 is a block diagram illustrating another exemplary step command message in accordance with the invention.

Referring also to FIG. 9, another exemplary step command message 310 is illustrated having a module address 312 and a step command message type 314. This message may be used to initiate a step of a device in accordance with the invention, where, for example, the device has been provided with a step type 306 and a step parameter 308 via a previous step parameter message 300 such as that illustrated in FIG. 8 and described supra. Many different message protocols are possible, including those not specifically illustrated in the figures, which fall within the scope of the present invention.

Figure 10A:
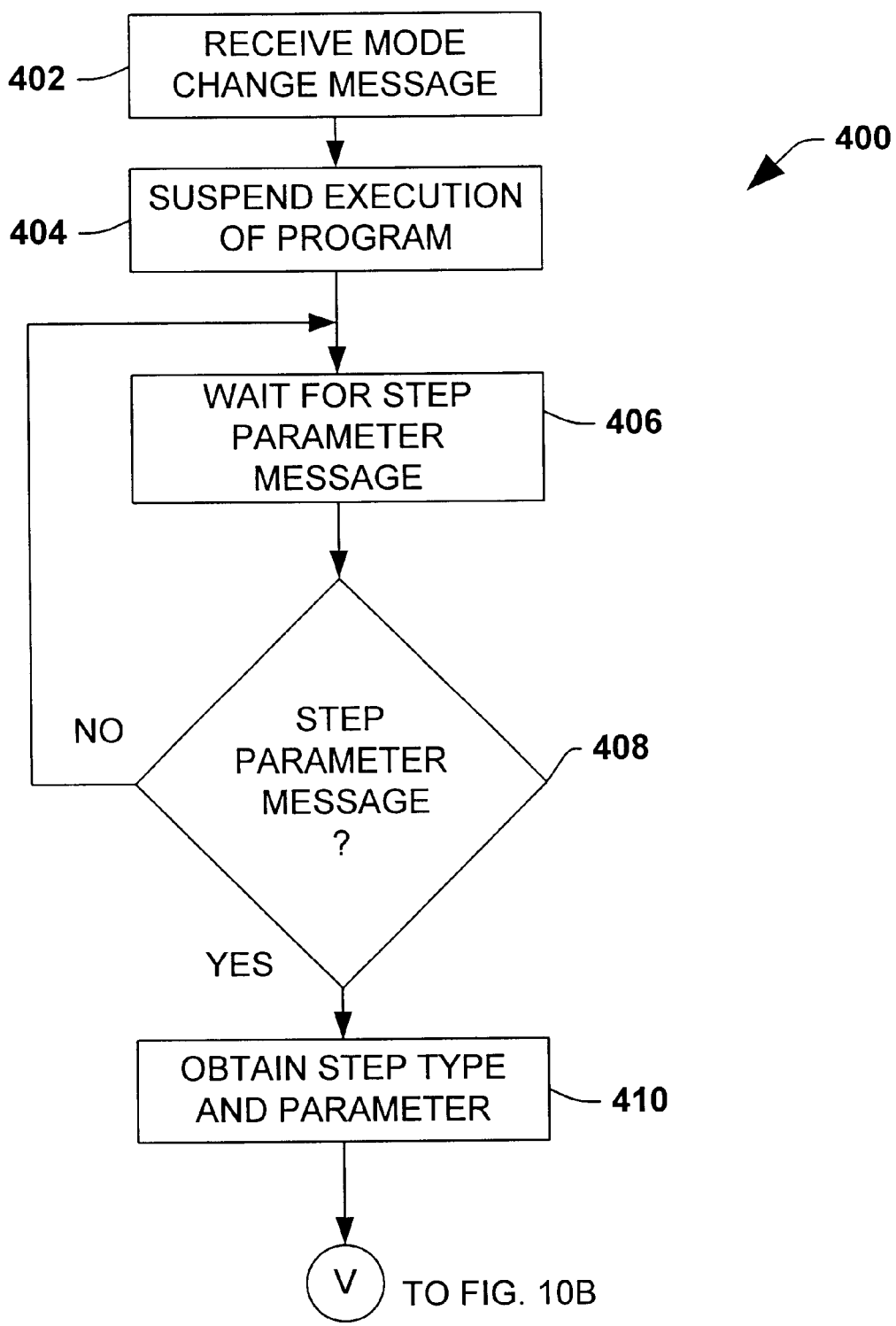
FIG. 10A is a flow diagram illustrating another method of performing a function in a control device in accordance with the invention.
Figure 10B:
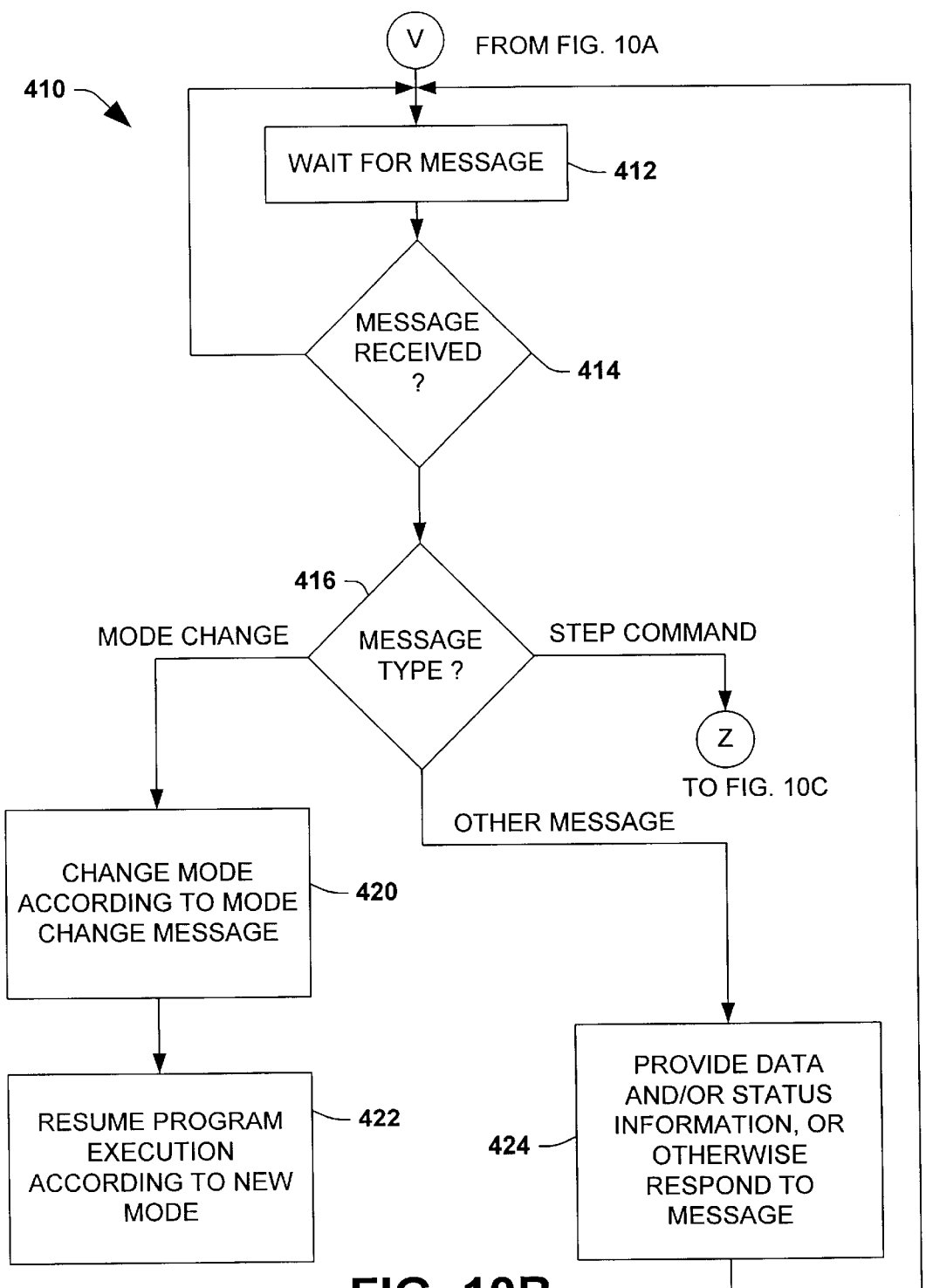
FIG. 10B is a flow diagram illustrating further aspects of the method of FIG. 10A.
Figure 10C:
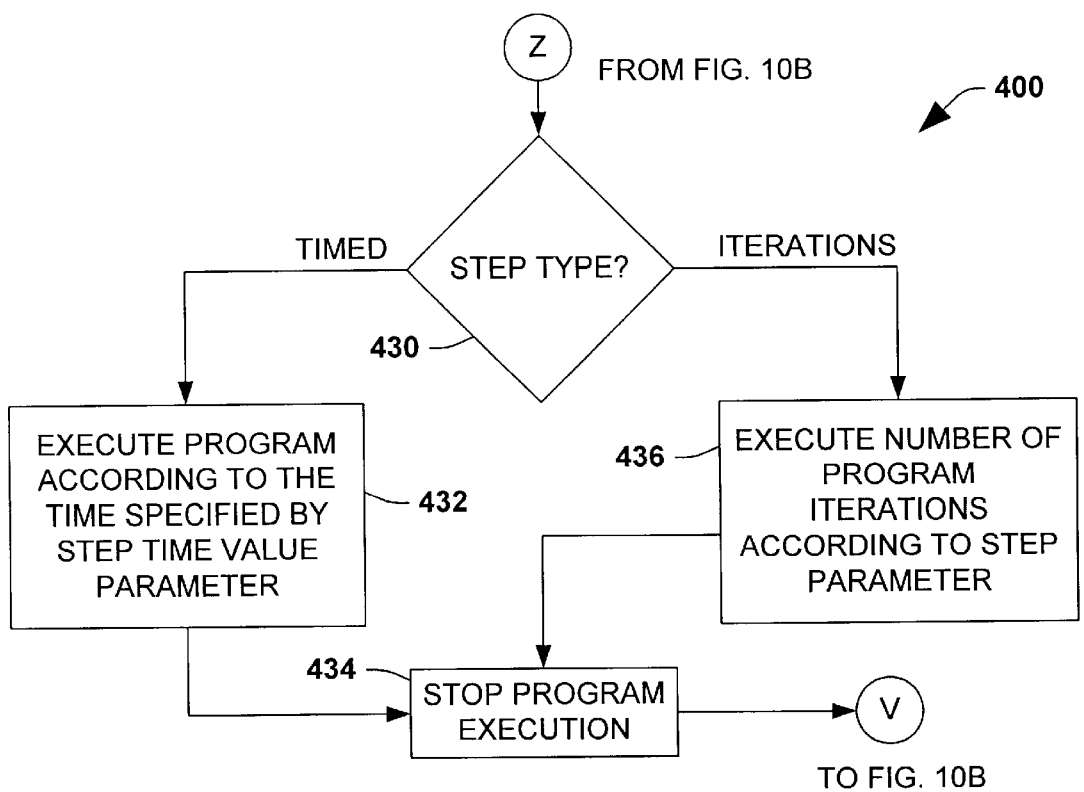
FIG. 10C is a flow diagram illustrating further aspects of the method of FIGS. 10A and 10B.

Referring now to FIGS. 10A, 10B, and 10C, another exemplary method 400 of performing a function in a control device is illustrated in accordance with the invention. A change mode message is received at step 402, after which execution of the program stored in the control device is stopped or suspended at step 404. Thereafter the device waits for a step parameter message at steps 406 and 408. It will be further appreciated that messages other than step parameter type messages may be received at this point (e.g., I/O messages, other mode change messages, etc.), which may be operated on and/or responded to accordingly. However, for the sake of brevity, the method 400 is illustrated in FIG. 10A as waiting for a step parameter type message via steps 406 and 408.

Once a step parameter message (e.g. message 300 of FIG. 8) is received at step 408, the step type and parameter are obtained therefrom at step 410. The device then waits for receipt of another message at steps 412 and 414 (FIG. 10B).

Upon receipt of a message at step 414, decision step 416 determines the message type. If the message is a step command message, the step command is executed as described in greater detail infra and illustrated in FIG. 10C. If the message is a change mode message, the device changes mode according to the mode change message at step 420, after which program execution is resumed according to the new mode at step 422. If the new message is not a step command or mode change type message (e.g., I/O or other explicit message), the device (e.g., device 110 and/or 112) provides status information and/or data (e.g., via a network message to the requester), or otherwise responds to the message at step 424, and returns to step 412 to await further messages.

Referring now to FIG. 10C, if the message received at step 414 is a step command type message, the device determines whether the step type (e.g., step type 306 of FIG. 8) is timed or iteration at step 430. If the step type is timed step, the device (e.g., device 110 and/or 112) executes its stored control program according to the time specified by the step time value parameter at step 432 before program execution is suspended or stopped at step 434. Alternatively, if the step type is iterations at step 430, the device executes the number of program iterations according to the step parameter at step 436 before program execution is stopped or suspended at step 434. Once the program has been stepped (e.g., timed step via step 432 or iteration stepped via step 436), and the program execution has again been stopped or suspended at step 434, the device again waits for a message at step 412 of FIG. 10B. Thus, a user may perform stepped execution of the control or logic program stored in the device, and obtain process or other information from the device at step 424 via I/O or other explicit messages while the program execution is suspended. Proceeding in this fashion, a user may advantageously troubleshoot system programming and other errors in widely distributed control systems.

It will be recognized that more than one device (e.g., devices 110 and/or 112) may be placed into step mode and respond to step commands, etc., via a single message. In this way, a user can synchronize single steps of distributed control system execution with a single network message. For example, a user may send a message from computer 104 in FIG. 3 to PLC 108, device 110 and device 112 to perform a specified time period of execution of the programs stored therein. Thereafter, data relating to the controlled processes 116, 120, and/or 122, respectively, can be obtained from the devices 108, 110, and/or 112 while the execution of these programs is stopped or suspended. This method or process can be repeated any number of times in order to facilitate the identification of problems and/or programming errors in the system hardware, logic programs, actuators, etc. In addition, different devices (e.g., devices 108, 110, and/or 112) may be sent different step parameters via a number of addressed step parameter messages, and then started via a single broadcast step command message. The present invention thus provides powerful diagnostic and debugging methods particularly applicable to widely distributed control systems. It will be further recognized that many message protocols are possible within the scope of the invention, beyond those illustrated and described herein.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the steps of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A method of performing a function in a control device comprising:

storing a program in a control device, the control device receives a message from a communications medium, the message includes instructions to suspend execution of the stored program at a particular location of the stored program;

executing at least a portion of the stored program in the control device according to the instructions;

suspending execution of the stored program according to the instructions; and receiving a mode change message with instructions therein to execute the stored program in a step mode from the location in which the program was suspended.

2. The method of claim 1, further comprising repeating executing the at least a portion of the stored program and suspending execution of the stored program, in response to another message from the communications medium.

3. The method of claim 1, further comprising providing data to the communications medium in response to a data request message from a network while execution of the stored program is suspended.

4. The method of claim 1, further comprising providing data to the communications medium in response to a data request message from a network while execution of the stored program is suspended.

5. The method of claim 1, wherein the mode change message further comprises a step type, and wherein executing the at least a portion of the stored program and suspending execution of the stored program are done according to the step type.

6. The method of claim 5, wherein the step type is a timed step and the instructions within the mode change message define a step time value.

7. The method of claim 6, wherein executing the at least a portion of the stored program comprises executing the stored program for a fixed time period according to the step time value, and wherein suspending execution of the stored program comprises stopping program execution after the fixed time period.

8. The method of claim 5, wherein the step type is step iteration, and the instructions within the mode change message define an integer number of iterations.

9. The method of claim 8, wherein executing the at least a portion of the stored program comprises executing the stored program an integer number of times according to the instructions within the mode change message, and wherein suspending execution of the stored program comprises stopping program execution after the integer number of iterations.

10. The method of claim 5, further comprising repeating executing the at least a portion of the stored program and suspending execution of the stored program, in response to another message from the communications medium.

11. The method of claim 5, further comprising providing data to the communications medium in response to a data request message from the network while execution of the stored program is suspended.

12. A system for performing a control function comprising:

a control device that executes a stored program and receives messages from a communications medium; and a master device that relays a message to the control device via the communications medium, the message comprising a parameter;

the control device executes at least a portion of the stored program according to the parameter and subsequently enters into a step mode according to the parameter, the step mode being one or more of a timed step mode and a step iteration mode, the parameter defining at least one of a time of steps and an integer number of steps.

13. The system of claim 12, wherein the control device executes the stored program an integer number of times according to the parameter, and stops execution of the stored program after the integer number of iterations.

14. A method of performing a function in a control device comprising:

providing a control device that selectively executes a program and receives messages from a network;

receiving a mode change message from the network;

suspending execution of the program according to the mode change message;

receiving a step command message from the network;

executing at least a portion of the program in the control device according to the message; and suspending execution of the program according to the message.

15. The method of claim 14, wherein the step command message comprises a type and a parameter, and further comprising:

selectively executing the program according to the type and the parameter for one of a fixed time period and a fixed number of iterations; and selectively suspending execution of the program according to the parameter after one of the fixed time period and the fixed number of iterations.

* * * * *